March 17, 1970     C. A. BEST     3,500,555

TEACHING DEVICE

Filed Oct. 4, 1967     2 Sheets-Sheet 1

Clarence A. Best
INVENTOR.

BY Clarence A. O'Brien
and Harvey B. Jacobson
Attorneys

March 17, 1970     C. A. BEST     3,500,555
TEACHING DEVICE
Filed Oct. 4, 1967     2 Sheets-Sheet 2
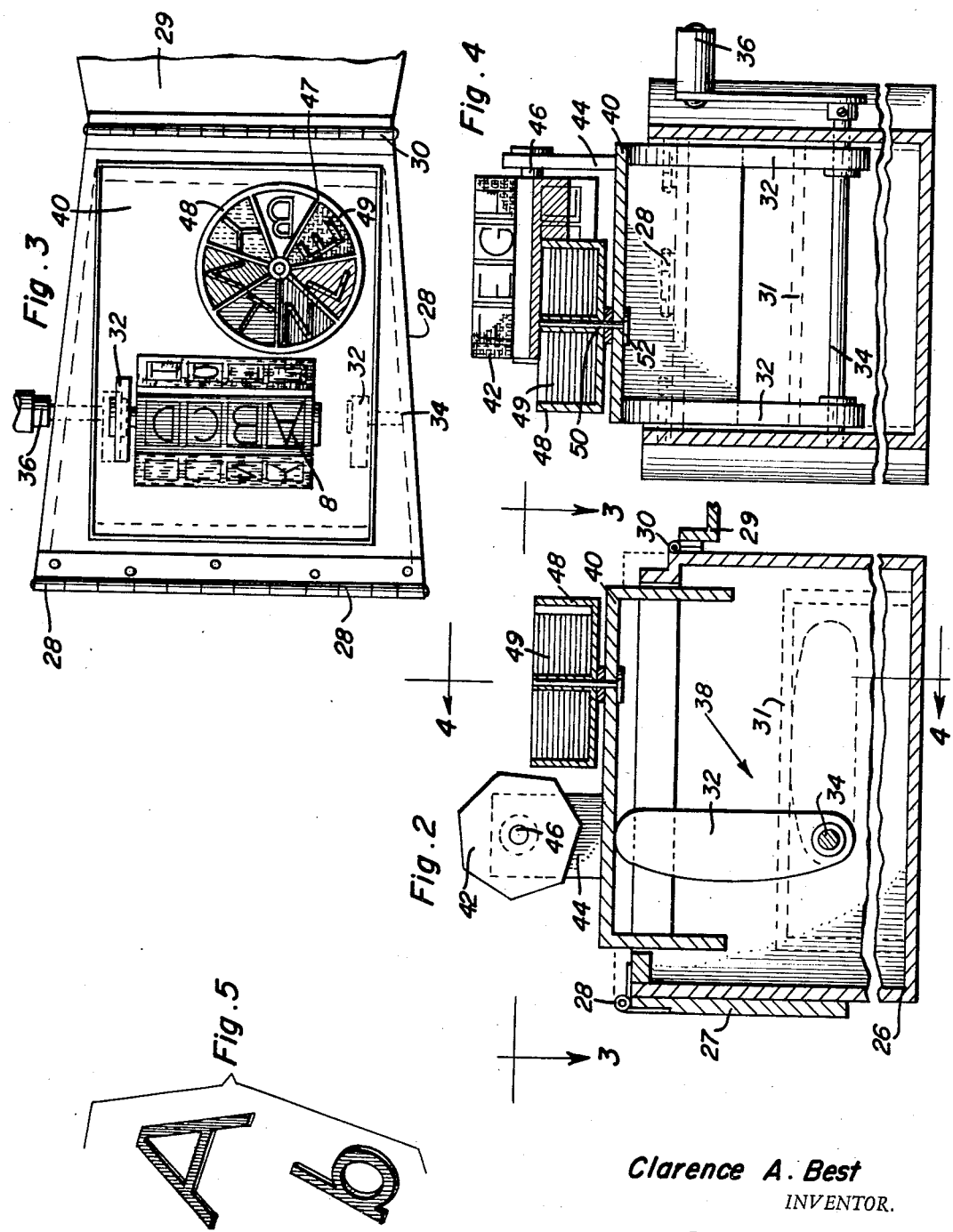
Clarence A. Best
INVENTOR.

United States Patent Office 3,500,555
Patented Mar. 17, 1970

3,500,555
TEACHING DEVICE
Clarence A. Best, P.O. Box 341,
New Albany, Ind. 47150
Filed Oct. 4, 1967, Ser. No. 672,890
Int. Cl. G09b 1/04
U.S. Cl. 35—8                                 5 Claims

ABSTRACT OF THE DISCLOSURE

An electrically lighted display board with a viewing surface which displays a matrix pattern of alphabetical letters for observation by a group of students. A light bulb is positioned above each letter and selected letters in the matrix may be emphasized by energizing those light bulbs corresponding to the selected letters. The control of energizing the bulbs is accomplished remotely by a switchboard console operated by a teacher and containing a control panel arranged in a matrix pattern similar to that of the display board. Further, alphabetical blocks are provided for a pupil seated in front of the display board. The pupil arranges a sequence of letter blocks in accordance with the letters which are flashed on the display board.

---

The field of the present invention relates to visual teaching aids and more particularly to electrically lighted display boards. Educators have long recognized the advantages of visual aids in the teaching of the alphabet and spelling. These advantages are manifest by increased attentiveness during a prolonged classroom period due to the enjoyable and pleasant nature of observing a visual teaching device and subsequently responding in the form of a game.

In the past, visual aids in the form of charts have been employed in the teaching or rudimentary language. However, with such a system only one pupil at a time may answer a teacher's question. As a result, other pupils do not actively participate during the entire activity. Further, prior constructions do not provide a visual correlation between various alphabetical characters and an associative entity such as color. Such correlation provides an expeditious means for a pupil to mentally differentiate between letters of the alphabet.

In summary, the present invention provides a matrix pattern of alphabetical letters arranged upon a display board wherein an electric bulb is provided above each letter to emphasize same when a corresponding bulb is lighted. To energize the bulb and thereby emphasize a particular letter, a remotely situated switchboard console is provided with a control switch panel arranged in a manner identical with the pattern on the display board. Actuation of a switch results in the lighting of the bulb on a display board corresponding to the particular switch. The matrix pattern of letters is divided into differently colored segments so that a pupil learns to associate the symbolic representation of an alphabetical letter with a color thereby facilitating the mental retention of the representation. This technique provides a marked improvement over prior devices. A further aspect of the present invention is to provide a pupil's desk located in front of the display board. The desk contains a storage container including letter blocks with alphabetical indicia upon each block. In addition, each letter block is colored to correspond with the color of the particular letter as evidenced by the appropriate colored segment of the display board. When a letter becomes emphasized on the board, a pupil retrieves a letter block from the storage container which corresponds to the displayed letter. A sequence of systematic retrievals will result in the positioning of letter blocks forming a word as selected and displayed by the teacher. Accordingly, among the salient objects of the present invention are:

To provide a visual display board system for teaching children the rudiments of language.

To provide a teaching aid which conveys the symbolic representations of language characters in a pleasant and effortless manner.

To provide a multi-colored matrix pattern of alphabetical letters in the form of upper and lower case characters.

To provide a facility for testing a pupil's response to color.

To provide a storage facility for letter blocks, each block color coded to correspond with the colors of an alphabetical letter matrix pattern.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a transverse sectional view of a pupil's desk.

FIGURE 3 is a top elevational view illustrating the prismatic color block and letter block container employed in the present invention.

FIGURE 4 is a rear sectional view of the pupil's desk.

FIGURE 5 illustrates a typical indicia for representing letters of the alphabet, the indicia characterized by a colored surface.

Figure 1:
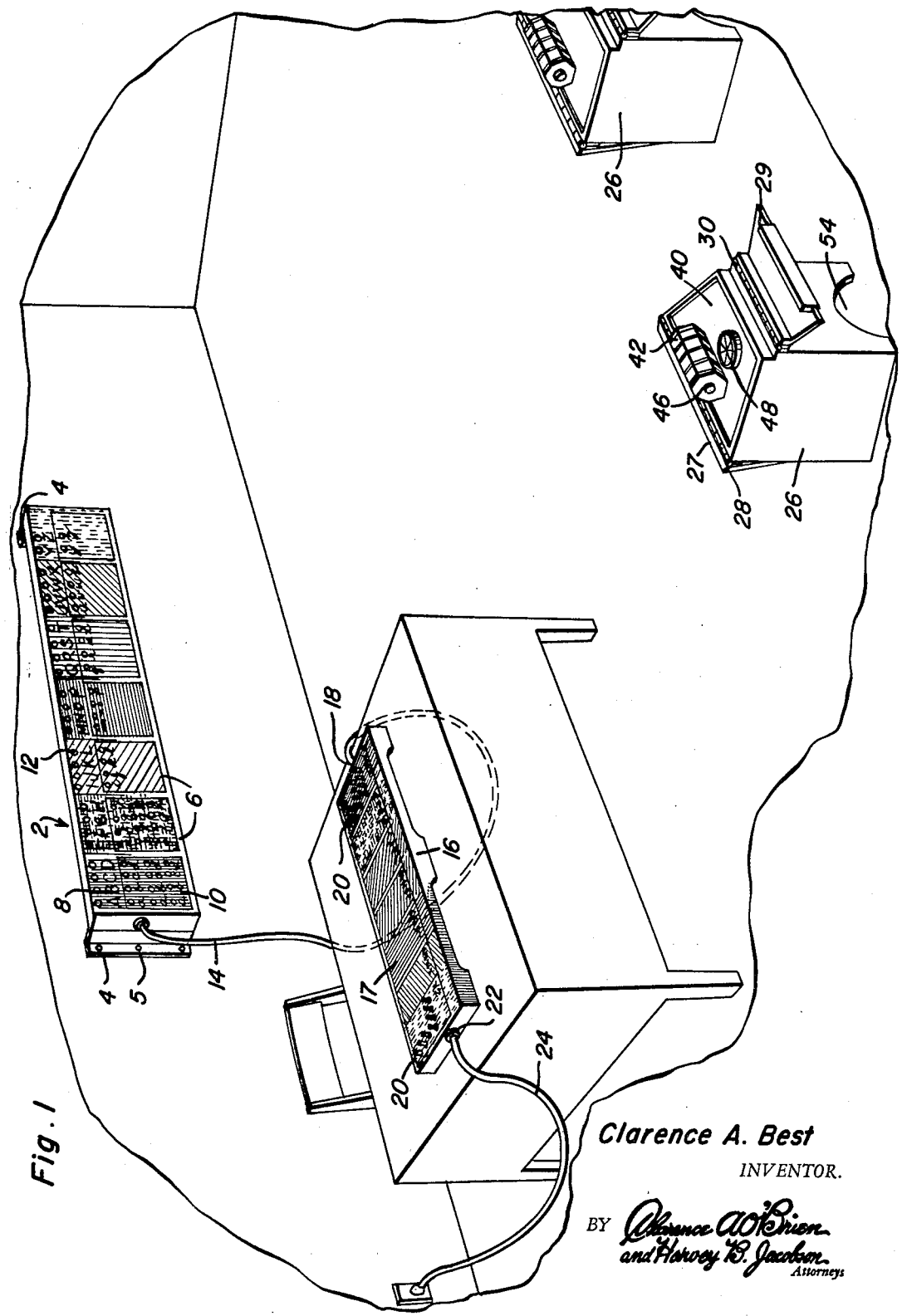
FIGURE 1 is a group perspective view of the teaching device employed in a classroom setting.

Referring to the drawings, a preferred embodiment of the invention is illustrated wherein display board 2 including wall mounting bracket 4 is typically fastened to a wall surface with suitable fasteners 5. The viewing surface of display board 2 is characterized by an alphabetical matrix pattern 6 consisting of twenty-six columns, one column for each alphabetical letter. The first row of alphabetical matrix 6 includes the twenty-six letters of the alphabet in upper case as illustrated by reference numeral 8. Subsequent lower rows of alphabetical letters are aligned with the top row and contain lower case letters 10 arranged so that each lower case letter resides in the same column as the equivalent alphabetical letter in upper case as evidenced by the first row in the matrix. Therefore, each position in a column contains the identical alphabetical letter with the exception of the topmost position which is in upper case. Each column contains a number of lower case letters to allow a teacher to spell a word with several identical alphabetical letters. The display board 2 is divided into multi-colored segments wherein sets of four adjacently positioned columns in the alphabetical letter matrix 6 are positioned within a segment which is colored differently from the adjacent situated colored segments. The display board 2 contains a multiplicity of light bulbs 12, with one light bulb being placed above each alphabetical letter. Multi-conductor cable 14 connects the light bulbs 12 of display board 2 to a switchboard console 16 at a point of electrical connection 18. The viewing surface of switchboard console 16 comprises a control panel 17 in which is arranged a switch matrix 20 arranged in a manner identical with the alphabetical letter matrix pattern on display board 2. Upon actuation of a particular switch in switch matrix 20, a corresponding light bulb 12 on display board 2 will light thereby emphasizing a particular alphabetical letter. Electrical power is provided to the electrical switch matrix 20 at the input point of connection 22 on the switchboard console 16. A source of voltage potential is provided to the electrical input 22 by a power cord 24.

In a classroom arrangement as illustrated in FIGURE of the drawings, a plurality of pupils desks 26 are arranged before the display board 2. Each desk includes a wingable desk top 27 attached to a piano hinge 28 which is fastened to the top portion of the front panel of desk 6 permitting the desk top 27 to be pivotally moved from a top overlying position to a front overlying position. When it is desirable to have a top planar writing surface on desk 26, a vertically movable, horizontally positioned apparatus platform 31 is lowered down into the desk as illustrated by the lowered apparatus platform position 31 in FIGURE 2 of the drawings. This top 27 is now rotated about piano hinge 28 so that the desk top forms a writing surface. Two aligned and laterally spaced cams 32 contact the bottom of apparatus platform 31. The cams 32 are mounted upon a shaft 34 which terminates in a handle crank 36. When it is desired to instruct the pupil with the present teaching system, the pupil's desk is prepared as follows: The desk top 27 is moved outwardly about piano hinge 28 of the desk, thereby exposing an underlying hinged shelf 29 clearly illustrated in FIGURE 1 of the drawings, the figure illustrating the position of the shelf 29 after it has been rotated outwardly about piano hinge 30. Next, crank handle 36 is rotated which in turn rotates cams 32 upwardly thereby raising the apparatus platform to the upper position shown by reference numeral 40. In this position, the cams maintain a vertically upward orientation represented by reference numeral 38. In the present position, the pupil has available to him, color block 42 which is a seven-sided prismatic block, each of the sides being colored differently in accordance with the colors employed on the display board. In addition, each side contains four sequential alphabetical indicia in upper case which corresponds to the color of the particular side. The prismatic block 42 is rotatable upon shaft 46 which is positioned within bracket 44 the latter being attached to apparatus platform 40.

Referring to FIGURE 3 of the drawings, alphabetical letter container 48 resembling a pie sliced in seven parts or sections 47 is horizontally and rotatably mounted upon apparatus platform 40 and located rearwardly of the prismatic block 42. Each section 47 of the container 48 is colored in a manner corresponding to the seven colors of the display board and prismatic block. Within each section of the container 48 are letter blocks 49 each colored to correspond with the color of the associated container section, each section 47 containing four upper case alphabetical letters corresponding to the particular color of the section and in addition containing a multiplicity of lower case letters corresponding to the aforementioned upper case letters. The cylindrical container 48 rotates about shaft 50 which is terminated in an anchor plate 52, the latter being affixed to the apparatus platform 40, as is shown in FIGURE 4. Each desk 26 is provided with an arcuate aperture formed along the bottom edge of the rear panel furnishing a foot relief 54.

In operation of the present teaching system, the planar desk writing surface is rotated away from the desk top area and made to overlie the front panel of the desk. The crank handle 36 is rotated until the apparatus platform is raised to the top of the desk. The pupil is instructed to watch the display board which will display a sequence of alphabetical letters by virtue of the lighting emphasis produced by electric bulbs above the alphabetical letters sequentially selected. As each bulb flashes, the pupil will turn the colored prismatic block to the position indicating a correspondence between the color of the prismatic block side which the pupil believes to be the color of the alphabetical letter indicated on the display board. This procedure aids to teach and test the pupil's ability to discern and match colors.

To teach the child's ability to correlate between alphabetical letters and their symbolic representation, a teacher actuates the switches associated with selected alphabetical letters thereby causing the particular letters selected to be indicated upon the display board. The pupil after observing an indicated letter, retrieves the identical symbol representation from the letter block container and places same upon a working shelf. As the teacher indicates succeeding alphabetical letters in a word, the pupil places a letter block indicating the letter on the shelf adjacent the preceding letter in the word. After the last letter in the word has been flashed on the board, the pupil places that letter block at the end of the word thus formed on the shelf thereby indicating that the pupil has achieved recognition of the symbolic representation of alphabetical letters in a particular word as well as developing the skill for spelling said word.

Although the foregoing description relates particularly to the teaching of alphabetical letters, it will be obvious to one skilled in the art to replace the alphabetical indicia with numbers or other language characters effectuating the inherent flexibility of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. A display system comprising means for displaying a matrix pattern of indicia, means for emphasizing each of said indicia independently of one another, means for controlling said emphasizing means from a remote location, said controlling means including a display of matrix pattern indicia identical to the pattern of said display means, said display means exhibiting adjacently disposed multi-colored panels, each of said colored panels including a preselected number of matrix pattern columns, at least one desk, said desk comprising a work top including means for indicating a particular color from a preselected number of colors, said preselected number corresponding to the total number of colors appearing on said display means, said last mentioned color indicating means further characterized by a plurality of sets of indicia, each set associated with the particular color as evidenced by said display means, and means for storing blocks characterized by a plurality of compartments equal in number to the colors appearing on said display means, each of said compartments colored a color of said display means, said compartments including only those indicia blocks corresponding to said color.

2. A teaching device comprising a display board characterized by a matrix pattern of indicia, a plurality of light bulbs, one of each of said bulbs positioned in close proximity to each of said indicia, a switchboard console including a control panel characterized by a matrix pattern of switches identical with a resultant pattern of said light bulbs, means for electrically connecting each of said bulbs with a corresponding one of said switches, and means for energizing said switches, a plurality of a preselected number of adjacent columns of said matrix pattern identified by a corresponding plurality of colors, said colors differing from one another, said matrix patterns further characterized by a first row of upper case alphabetical letters succeeded by a plurality of rows of lower case letters, each of said lower case letters vertically aligned under a corresponding alphabetical letter of the upper case, and further wherein one each of said light bulbs is positioned above each of said letters, a housing, a hinged writing surface adapted to swing outwardly from the top of said housing, a raisable platform normally positioned within said housing to overlie the base of said housing in spaced relation thereto, at least one cam normally engaging the under-side of said platform, said cam mounted upon a shaft disposed perpendicularly to side panels of said housing, a crank handle disposed along a terminal length of said shaft, said handle located outwardly of said housing and adapted to be cranked by hand, angular rotation of said cam resulting in upward movement of said platform, said platform supporting colored playing blocks having alphabetical letters thereon to be manipulated so as to match preselected indicated letters on the display board.

3. A construction as set forth in claim 2 together with a cylindrical container including a plurality of pie-shaped multicolored compartments, each of said colors corresponding to a color appearing on said display board, said compartments including a plurality of said playing blocks, said blocks characterized by indicia on a colored surface thereof, the color of said colored surface corresponding to the color of the compartment in which said blocks are stored.

4. A construction as recited in claim 2 together with a bracket plate disposed perpendicularly to said platform and affixed thereto, a shaft rotatably mounted within said bracket plate and disposed to overlie said platform in spaced relation thereto, a seven-sided right prismatic block rotatably mounted on said last shaft, each of said seven sides being characterized by a colored surface, each of said last mentioned colors different from the remainder, each of said surfaces further characterized by a plurality of indicia.

5. A construction as recited in claim 3 wherein said blocks in each of said compartments include only indicia corresponding to the color of said blocks as evidenced by said display board.

References Cited

UNITED STATES PATENTS 2,500,507   3/1950   Avery et al. _____ 35—5

EUGENE R. CAPOZIO, Primary Examiner

W. H. GRIEB, Assistant Examiner

U.S. Cl. X.R.

35—73